United States Patent
Myers et al.

(10) Patent No.: US 6,613,296 B1
(45) Date of Patent: Sep. 2, 2003

(54) RELIEVED SUPPORT MATERIAL FOR CATALYTIC CONVERTER AND THE PROCESS OF MAKING THE SAME

(75) Inventors: Stephen Joe Myers, Owosso, MI (US); Alan Gerard Turek, Mayville, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/493,592

(22) Filed: Jan. 31, 2000

(51) Int. Cl.[7] .............. F01N 3/10; F01N 3/08; B01D 50/00; B01D 53/34; B01J 8/04
(52) U.S. Cl. .............. 422/179; 422/173; 422/176; 422/177; 422/180; 422/190
(58) Field of Search .............. 422/173, 176, 422/177, 179, 180, 190

(56) References Cited

U.S. PATENT DOCUMENTS

| | | | | |
|---|---|---|---|---|
| 5,250,269 A | * | 10/1993 | Langer | 422/179 |
| 6,010,668 A | * | 1/2000 | Lawrence et al. | 422/176 |
| 6,162,403 A | * | 12/2000 | Foster et al. | 422/173 |
| 6,217,832 B1 | * | 4/2001 | Betta et al. | 422/179 |
| 2001/0051116 A1 | * | 12/2001 | Hornback, III et al. | 422/179 |

* cited by examiner

*Primary Examiner*—Glenn Caldarola
*Assistant Examiner*—Douglas W. Rudnick
(74) *Attorney, Agent, or Firm*—Vincent A. Cichosz

(57) ABSTRACT

A relieved support material for a catalytic converter has a strip of support material with one or more relief cuts. This is used to insulate a segment of catalyst along with one or more inner end-cones positioned at the beginning and end of the converter. The support material is wrapped around the catalyst and the one or more inner end-cones. The wrapped support material is then covered with an outer-layer shell.

13 Claims, 2 Drawing Sheets

RELIEVED SUPPORT MATERIAL FOR CATALYTIC CONVERTER AND THE PROCESS OF MAKING THE SAME

TECHNICAL FIELD

The invention relates to insulative support material for a catalytic converter, and in particular, to the end-cone portion wrapped therewith.

BACKGROUND OF THE INVENTION

Catalytic converters are employed in vehicles to catalyze exhaust gasses. Typically, a catalytic converter is a cylindrically shaped canister containing a subassembly of a catalyst portion surrounded by insulative support material. This subassembly is then covered by an outer-layer.

As the exhaust system receives hot gasses that are potentially harmful to other vehicle components, catalytic converters are usually well insulated. Therefore, an intumescent insulation layer, also known as a support material layer or support mat, is positioned about the catalyst portion of a typical catalytic converter. Inner end-cones are affixed at the inlet and outlet portions of the catalyst portions. These inner end-cones serve as both caps and ends to catalytic converter housings and provide openings for exhaust gasses to flow into and out of the catalytic converter. The insulative support material, however, should also cover the end-cone portions. Therefore, the support material layer is generally provided to surround and support the end-cone portion of the catalytic converter.

One method of manufacturing catalytic converters is to provide a pre-made canister and stuff it with the catalyst substrate and the insulation pad. In this method the catalyst substrate is wrapped with an insulation layer of a selected thickness and weight (various weights are employed for various applications and desired properties). The assembly is then forced through a reduction cone and into the converter shell where pressure can be required to accomplish the insertion of the assembly into the can. The method is costly and can result in support material that is overly compressed.

A commonly preferred method for producing a catalytic converter is known as "the tourniquet method". The tourniquet method dispenses with the reducing cone and thus avoids the high insertion pressures on the catalyst substrate and support material. The method places the substrate and support material assembly into a canister open on one longitudinal edge. The canister is closed around the assembly by straps and compressed to the desired size. The open ends of the canister will, in this position, be overlapping and then are welded together. This method is also expensive and labor intensive. Further, due to this overlap, engineering design consideration must be given to the space alteration inside the canister Furthermore, the overlapped edge causes a density change in the support material in the area of the overlap. This also can be expensive and can result in support material that is overly compressed.

What is needed in the art is a low cost catalytic converter assembly that is durable and easily assembled.

SUMMARY OF THE INVENTION

The deficiencies of the above-discussed prior art are overcome or alleviated by the present invention of a relieved support material for a catalytic converter. The relieved support material for a catalytic converter comprises a support material having a density and one or more relief cuts wherein said one or more relief cuts allow said support material to engage an inner end-cone without increasing the density.

The catalytic converter with the relieved support material of the present invention comprises: a catalyst substrate comprising a catalyst, said catalyst substrate having a first end and a second end and a perifery; an inner end-cone having a pinch trim end, wherein said pinch trim end of said inner end-cone is connected to said first end of said catalyst substrate, wherein said inner end-cone forms an inlet or outlet of said catalyst substrate; support material having relief cut, wherein said support material is concentrically disposed about the periphery of said catalyst substrate and around said inner end-cone such that said pinch trim end is disposed within said relief cut; and an outer-layer shell concentrically disposed about an external surface of said support material.

The method of producing a catalytic converter with a relieved support material of the present invention comprises: supplying a catalyst substrate having a periphery, a first end and a second end and comprising a catalyst; connecting a first pinch trim end of a first inner end-cone to said catalyst substrate first end and a second pinch trim end of a second inner end-cone to said catalyst substrate second end to form a catalyst assembly; making a first relief cut across a support material near a first end of said support material to be disposed at said first end of said catalyst substrate; wrapping said support material concentrically around said catalyst assembly to form a support assembly, wherein said first pinch trim end of said first inner end-cone is disposed within said first relief cut; disposing said support assembly concentrically within an outer-layer shell.

The above-discussed and other features and advantages of the present invention will be appreciated and understood by those skilled in the art from the following detailed description and drawings.

BRIEF DESCRIPTION OF THE DRAWINGS

The present invention will now be described, by way of example only, with reference to the accompanying drawings, which are meant to be exemplary, not limiting, and wherein like elements are numbered alike in several Figures, in which.

DETAILED DESCRIPTION OF THE PREFERRED EMBODIMENT

The present invention is a stress relieved support material particularly for a catalytic converter assembly and method of producing the same. The intumescent support material serves to insulate the catalyst substrate, reducing the outer-layer skin temperature, and thereby reducing the need for high temperature parts. Thereby, the catalyst substrate is assisted in obtaining and maintaining a temperature that is within a proper operating range. As a further benefit, the catalytic converter manufacturing is simplified and less expensive.

The catalytic converter described herein comprises a subassembly of a catalyst substrate that is surrounded by support material with inner end-cones at the inlet and/or outlet of the catalyst substrate also surrounded by the support material. This subassembly is then covered by an outer-layer shell. The shell of the catalytic converter can employ any geometric design that allows exhaust gas to enter, flow through the catalyst, and then exit the shell. Typically, the design utilized is substantially tubular with other geometries possible. The composition of the shell can be of any material capable of maintaining the desired structural integrity in an operating environment which, for example, can be at temperatures up to 1,000° C. with exposure to exhaust gases and often extreme weather conditions. Although numerous materials and alloys can be employed, ferrous materials and alloys preferred, with stainless steel especially preferred.

The catalyst substrate, which is typically disposed in the center of the converter, can be comprised of any standard material that is commonly used in automobile catalytic converters for supporting the desired catalyst. For example, ceramic, metallic foils, combinations thereof, and others materials capable of handling high temperature exhaust can be used. This catalyst substrate preferably comprises a catalyst capable of reducing emissions. Possible catalysts include noble metals, metal oxides, and mixtures and alloys thereof, as well as other conventional catalytic converter catalysts.

Figure 4:
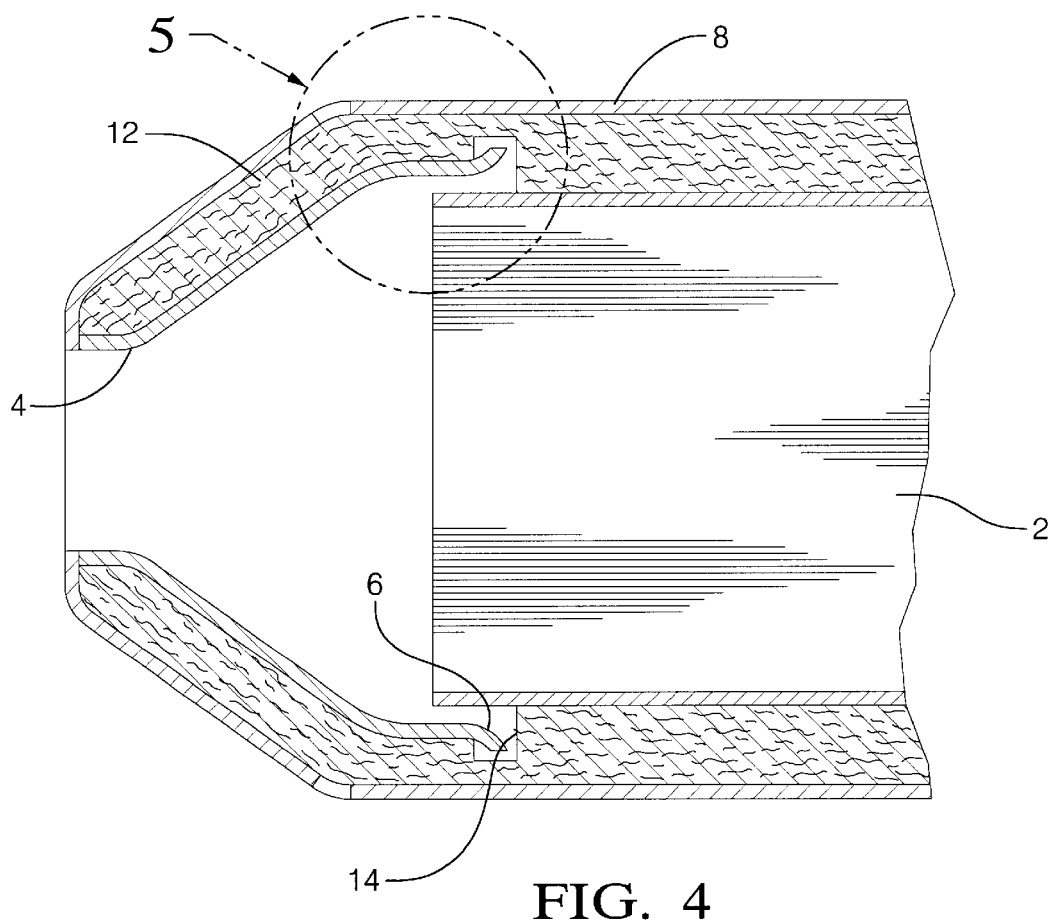
FIG. 4 is a cross sectional view of one embodiment of an assembled catalytic converter of the present invention having stress-relieved intumescent support material.

Generally, attached at one or both ends of the catalyst substrate are frustoconical end-cones (i.e. the ends have truncated conical geometry), or another geometry compatible with the catalyst substrate and the outer end-cones. Over the inner end-cone sections, support material is provided to inhibit heat loss and maintain proper outer-layer temperature. Inner end-cone sections can be attached to the subassembly by aligning the trim with the stress relief groove (shown in FIG. 4).

The support material may be any material capable of providing sufficient thermal insulation and preferably capable of holding the substrate in the desired location while being inserted into a shell. This material can be a formed fibrous material (e.g., chopped, random, woven, non-woven, preforms, etc.) containing vermiculite, refractory ceramic fibers, organic binders, combinations thereof and other conventional materials. The support material can either be a simple non-expanding ceramic material, or an intumescent material, e.g., one which contains a vermiculite component that expands with heating to maintain firm compression when the outer steel expands outward from the catalyst substrate, as well as material which include a combination of both. Typical non-expanding ceramic fiber materials include ceramic materials such as those sold under the trademarks "NEXTEL" and "SAFFIL" by the "3M" Company, Minneapolis, Minn. or those sold under the trademark, "FIBERFRAX" and "CC-MAX" by the Unifrax Co., Niagara Falls, New York, and the like. Some of the typical intumescent ceramic material include ceramic materials such as those sold under the trademark "INTERAM" by the "3M" Company, Minneapolis, Minn. as well as those intumescents which are also sold under the aforementioned "FIBERFRAX" trademark, as well as combinations thereof and others.

Figure 1:
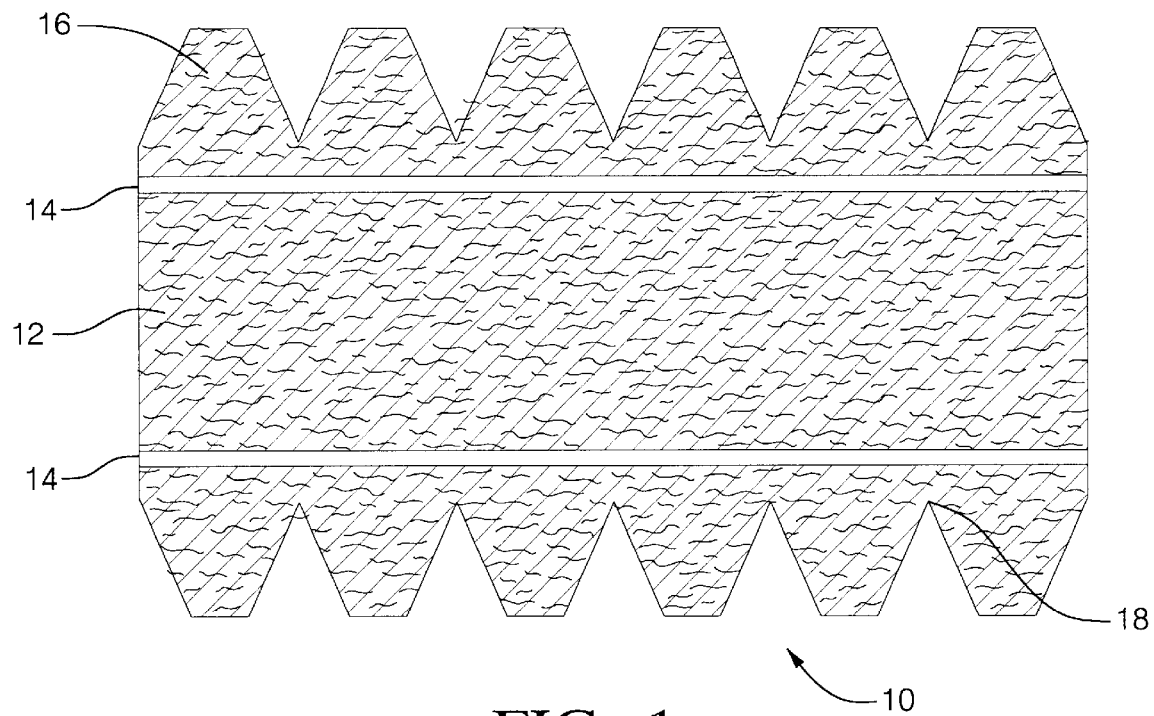
FIG. 1 is an open view of one embodiment of an intumescent support material of the present invention that has been die cut with a truncated saw-tooth edge.

Referring to FIG. 1, a strip of intumescent support material 10 is shown prior to placement about a catalyst substrate. After formation of the support material 10, in one embodiment, cuts are made about the edges of the support material in a lengthwise fashion to remove sufficient material such that, when wrapped around the catalyst substrate and end-cone(s), the edges of the support material 10 do not substantially overlap. (See FIG. 4) That is, the thickness of the support material 10 disposed over the end-cone(s) is preferably not doubled in areas due to over-lap. Most preferably, cuts are made and materials removed such that, the support material 10 has a substantially uniform thickness over the end-cones and over the catalyst substrate, in areas other than the relief cuts 14, once disposed about the catalyst substrate and the inner end-cones.

The cuts can have any geometry capable of forming the above described thickness, with truncated serrated or saw-tooth edge 16 typical. The specific size and geometry of the cuts are dependent upon the geometry of the end-zone. For conical end-zones, substantially triangular cuts with truncated ends are generally preferred. By removing sufficient amounts of material, the body portion 12 of support material 10 can be wrapped about the catalyst leaving edge 16 to be wrapped over the end-cone section 4 (See FIG. 5). Edge 16 allows for the end portions of the support material 10 to fit flush when positioned over an end-cone. Thereby, any protrusions or overlaps of support material 10 over the end-cone are eliminated. The design of edge 16 is preferably manufactured for forming an uninterrupted layer of support material 10 over the end-cone area. While one layer of support material 10 is shown, multiple layers can be used and configured with the saw-tooth profile so as to form an uninterrupted layer of material in the end-cone area.

In addition to the cuts made for forming the edge 16, relief cuts 14 are preferably made into the support material 10 to provide stress relief. Cuts 14 are made to a depth whereby only a portion of the support material 10 is removed. These cuts 14 are preferably made across the support material 10, substantially perpendicular to points 18 of edge 16 such that, when the support material 10 is wrapped around the catalyst substrate 2, relief cuts 14 are disposed around the circumference of the catalyst substrate 2 so as to engage end-cone pinch trim 6. Without stress relief cuts, support material 10 would be likely to compress at the pinch trim edge of the end-cone which thereby would increase the mount density at those points. The removal of material allows for a reduced mount density of support material 10 in the area of cuts 14.

Figure 3:
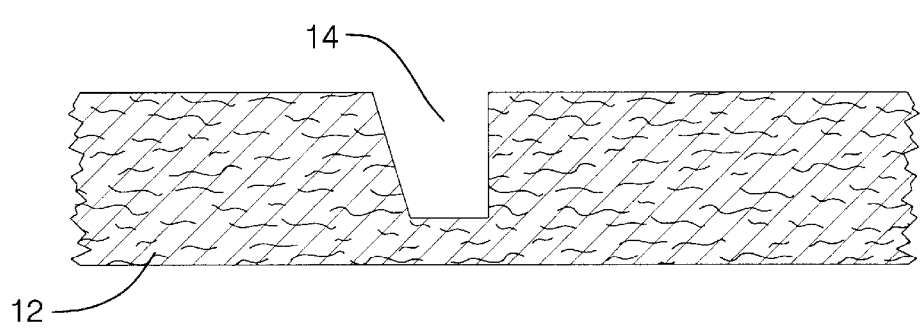
FIG. 3 is a cross sectional view of the intumescent support material of FIG. 2 after cutting.
Figure 5:
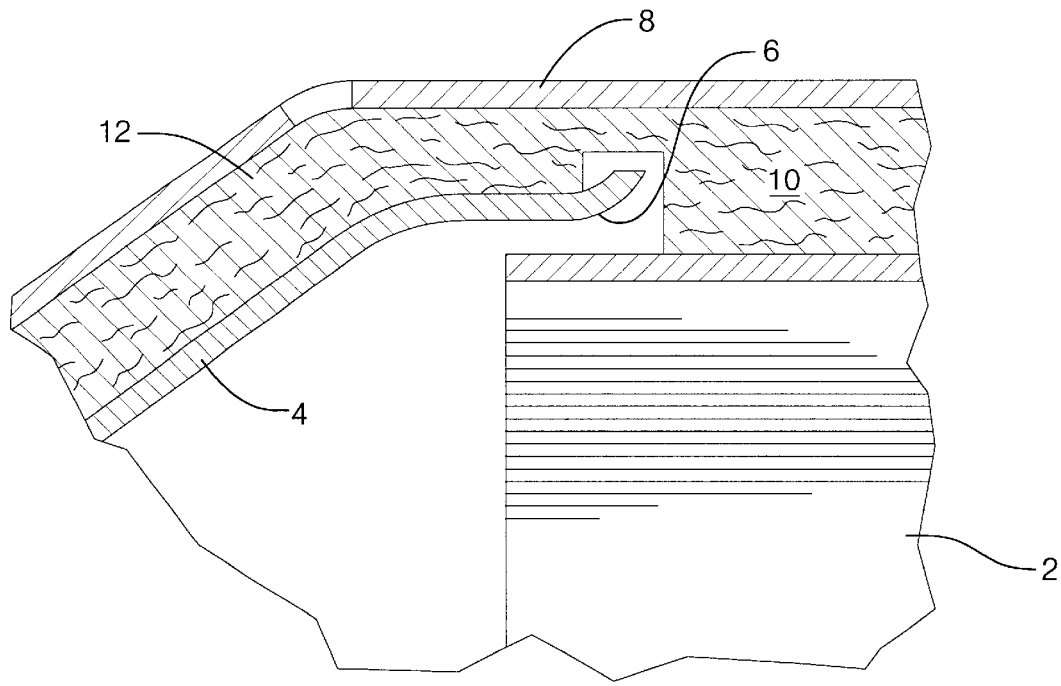
FIG. 5 is an enlarged cross sectional view of the outer-shell/intumescent-mat/end-cone interface, shown in phantom, as 5 in FIG. 4.

The amount of support material 10 that is cut away to form the relief cuts 14 should be of sufficient width and depth so as to allow for a reduced mount density in the area of the pinch trim end 6 upon assembly of the catalytic converter (see FIG. 5). Thereby, over compression of the support material 10 in the pinch trim end area is avoided. Removal of support material from relief cut 14 forms a channel in the surface of support material 10 as it is illustrated in FIG. 3 where a length of support material 10 has a relief cut 14. Typically, the width of relief cut 14 can be up to about 5 millimeters (mm) or more, with about 2 mm to about 4 mm typically preferred, and about 2.5 mm to about 3.5 mm most preferred.

The depth of offal that is cut away to form the relief cut 14 is dependent upon the size of the pinch trim end 6 and the amount the pinch trim end 6 will extent into the support material 10. The depth should be sufficient to accept the pinch trim end 6 without substantially increasing the density of the support material 10 in the area of the pinch trim end 6 (e.g., the density in that area does not exceed about 1.4 grams per cubic centimeter (g/cc)), while substantially maintaining the desired insulative characteristics. Typically a depth of about 2 mm to about 4.5 mm, can be employed with a depth of up to about ⅔ of the thickness of the support material 10 surrounding the body of the catalyst substrate 2 preferred. (Note, the thickness of the support material 10 which surrounds the catalyst may or may not be the same thickness as the portion of the support material 10 which surrounds the inner end-cones.) This thickness allows clearance for the pinch trim edge and sufficient residual strength for handling during converter assembly.

Figure 2:
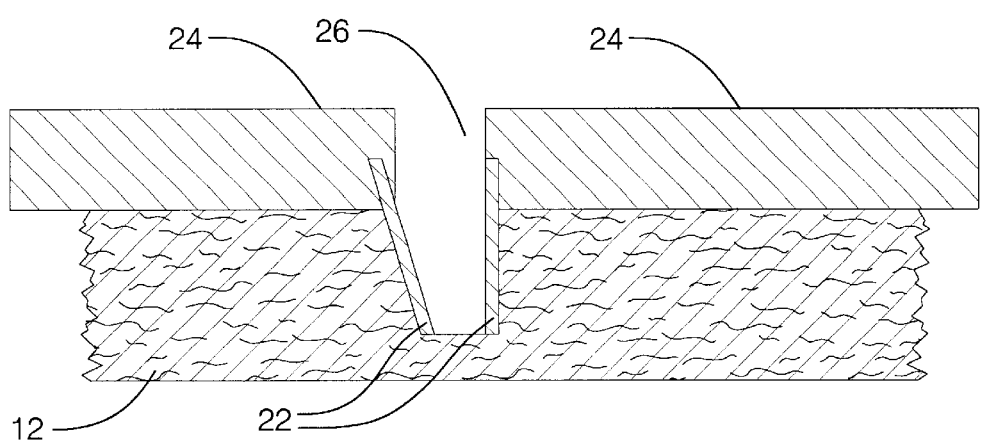
FIG. 2 is a cross sectional view of one embodiment of intumescent support material of the present invention with a die cutting configuration for creating the stress relief groove.

The relief cuts 14 can be produced using any conventional technique, including using blades 22 as shown in FIG. 2. Blades 22 can be steel rule die blades attached to a die backing plate 24. Within plate 24, a relief 26 is provided to allow for the removal of offal. Optionally, blades 22 are contoured so that one blade is substantially perpendicular to support material 10, while the other blade is slightly angled upon insertion for the cut. This allows for easier removal of the offal. Relief cuts 14, while shown in FIG. 1 as continuous strips, can be formed intermittently if the pinch trim end of an attached end-cone does not compress the support material.

One method of forming the catalytic converter with the stress relieved support material 10 is to first place end-cone 4 onto the catalyst substrate 2, which forms a subassembly. Thereafter, support material 10, having relief cuts 14, is wrapped around the subassembly. The wrapped subassembly is then packed into an outer-layer shell 8 and the shell 8 is formed over one or more inner end-cones 4 using spin or ram forming, or another conventional technique, to produce a reduced end diameter over the end-cone.

The stress relieved support material of the present invention provides the advantages of a reduction in cost from changing from two separate support material layers (one being over the one or more inner end-cones and one being over the catalyst) to one continuous layer. Thereby, the catalyst and inner end-cones are insulated by the same support material layer, simplifying assembly of the converter by both fewer parts and by eliminating the separate step of covering the inner end-cones with a second support material. The finished product's insulative efficiency is also improved (e.g. by about 2% or more) because the support material is less dense at the pinch end areas of the inner end-cones (i.e. lower mount density).

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A relieved support material for a catalytic converter, the catalytic converter including an inner end-cone and a catalyst substrate disposed in an outer-layer shell, the relieved support material comprising:
    a strip of support material disposed between the outer-layer shell and the inner end-cone and disposed between the outer-layer shell and the catalyst, said strip of support material including one or more relief cuts wherein at least a portion of an end of the inner end-cone is received in said one or more relief cuts.

2. The relieved support material of claim 1, wherein said relief cuts form one or more channels in said strip of support material, said channels extending lengthwise around at least a portion of a circumference of the catalyst substrate.

3. The relieved support material of claim 2, said channels are intermittent or continuous.

4. The relieved support material of claim 2, wherein said relief cuts are up to about 5 mm in width.

5. The relieved support material of claim 4, wherein said relief cuts are about 2 mm to about 4 mm in width.

6. The relieved support material of claim 5, wherein said relief cuts are about 2.5 mm to about 3.5 mm in width.

7. The relieved support material of claim 1, wherein a depth of said relief cuts is up to about ⅔ of an original thickness of said strip of support material.

8. A catalytic converter with a relieved support material, comprising:
    a catalyst substrate comprising a catalyst, said catalyst substrate having a first end and a second end and a periphery;
    an inner end-cone having a pinch trim end, wherein said pinch trim end of said inner end-cone is connected to said first end of said catalyst substrate, wherein said inner end-cone forms an inlet or outlet of said catalyst substrate;
    a support material having a relief cut, wherein said support material is concentrically disposed about the periphery of said catalyst substrate and around said inner end-cone such that said pinch trim end is disposed within said relief cut; and
    an outer-layer shell concentrically disposed about an external surface of said support material.

9. A method of producing a catalytic converter with a relieved support material, comprising:
    supplying a catalyst substrate having a periphery, a first end and a second end and comprising a catalyst;
    connecting a first pinch trim end of a first inner end-cone to said catalyst substrate first end and a second pinch trim end of a second inner end-cone to said catalyst substrate second end to form a catalyst assembly;
    making a first relief cut across a support material near a first end of said support material to be disposed at said first end of said catalyst substrate;
    wrapping said support material concentrically around said catalyst assembly to form a support assembly, wherein said first pinch trim end of said first inner end-cone is disposed within said first relief cut;
    disposing said support assembly concentrically within an outer-layer shell.

10. The method of producing a catalytic converter as in claim 9, wherein said making said relief cut comprises removing a sufficient quantity of said support material such that when said pinch trim does not substantially increase a density of said support material in said relief cut.

11. The method of producing a catalytic converter as in claim 9, wherein a depth of said relief cut is up to about ⅔ of an original thickness of said support material.

12. The method of producing a catalytic converter as in claim 9, further comprising making a second relief cut near a second end of said support material to be disposed at said second end of said catalyst substrate, wherein when said support material is wrapped around said catalyst assembly, said second pinch trim end is disposed within said second relief cut.

13. The method of producing a catalytic converter as in claim 9, further comprising spin forming said outer-layer shell to form outer end-cones concentrically around said first and said second inner-end cones.

* * * * *